United States Patent

[11] 3,599,064

| [72] | Inventor | Jay Friedman |
| | | Lawndale, Calif. |
| [21] | Appl. No. | 872,025 |
| [22] | Filed | Oct. 29, 1969 |
| [45] | Patented | Aug. 10, 1971 |
| [73] | Assignee | Loyola Industries, Inc. |

[54] DC MOTOR DRIVE USING COMBINED ARMATURE AND FIELD CONTROL
3 Claims, 2 Drawing Figs.

| [52] | U.S. Cl. | 318/338, 318/331 |
| [51] | Int. Cl. | H02p 5/16 |
| [50] | Field of Search | 318/332, 338 |

[56] References Cited
UNITED STATES PATENTS

| 3,197,688 | 7/1965 | Horner | 318/338 |
| 3,284,688 | 11/1966 | Black | 318/332 |
| 3,378,746 | 4/1968 | Weiser | 318/332 |
| 3,419,777 | 12/1968 | Asseo | 318/338 |
| 3,148,318 | 9/1964 | Bradburn, Jr. | 318/338 |

Primary Examiner—Oris L. Rader
Assistant Examiner—Thomas Langer
Attorney—Pastoriza and Kelly ABSTRACT: A DC motor drive for the armature and associated field winding of the motor includes an armature feedback loop responsive to the current flow in the armature, an input command signal such as a speed control signal, and the actual speed of the armature for providing a control of the current supplied by a DC source means to the armature to thereby provide speed control of the motor. A field feedback loop control is also provided and includes means responsive to the voltage across the armature and to the line voltage supplied to the armature for providing a control of the field intensity to assure that the back EMF of the armature is always less than the available DC voltage supplied to the armature. This dual feedback control provides for a faster response time of the armature throughout its total speed range together with the feature of a constant torque for different speeds.

INVENTOR.
JAY FRIEDMAN
BY Pastoriza & Kelly,
ATTORNEYS.

DC MOTOR DRIVE USING COMBINED ARMATURE AND FIELD CONTROL

This invention relates generally to electrical motors and more particularly, to an improved DC motor drive generally, although not limited to, commercial variable speed DC motors driven from three phase AC electrical sources.

BACKGROUND OF THE INVENTION

It is common practice in DC motor drives to control motor speed by control of the armature voltage at slower speeds and thence control of the field intensity at higher speeds. In field control of the motor speed, the response time is inherently slow. Moreover, there is lacking any suitable control of the back EMF of the armature with the result that if this back EMF equals or exceeds the voltage supplied to the armature, it is not possible to drive the motor any faster.

In the case of armature voltage control for speed variation below certain base speeds, compensation must be made for the IR loss in the armature.

In both instances of slow and high-speed control utilizing armature voltage control and field intensity control, respectively, the motor torque is normally unstable throughout the overall speed range.

BRIEF DESCRIPTION OF THE PRESENT INVENTION

With the foregoing in mind, it is a primary object of the present invention to overcome the foregoing difficulties by combining both armature and field control throughout the entire speed range of the motor.

Briefly, the invention contemplates the provision of an armature feedback loop having means responsive to the current flow in the armature, the controlling command signal externally applied to control the desired speed of the motor, and the actual speed of the armature for providing a control of the current supplied to the armature and thereby provide speed control. Thus, rather than voltage control of the armature, current control to the armature is utilized with the advantage that the response time is considerably increased over that available with field intensity control and the further advantage that no compensation for IR losses in the armature is necessary for armature control.

The invention further contemplates in combination a field feedback loop having means responsive to the voltage across the armature and the line voltage supplied to the armature for providing a control of the field intensity in such a manner as to assure that the back EMF of the armature is always less than the available DC voltage supplied to the armature. By providing this field control feedback loop, the DC current source means for the motor is always capable of driving more current to the armature to increase the armature speed throughout the speed range of the motor.

Essentially, therefore, the invention combines a constructively intercoupled control of armature current and field intensity permitting the respective feedback loops to operate in a concerted manner to effect the performance of the motor in such a way that, from an external point of view, it performs as a single control loop.

BRIEF DESCRIPTION OF THE DRAWINGS

A better understanding of the invention will be had by now referring to the accompanying drawings, in which.

Figure 1:
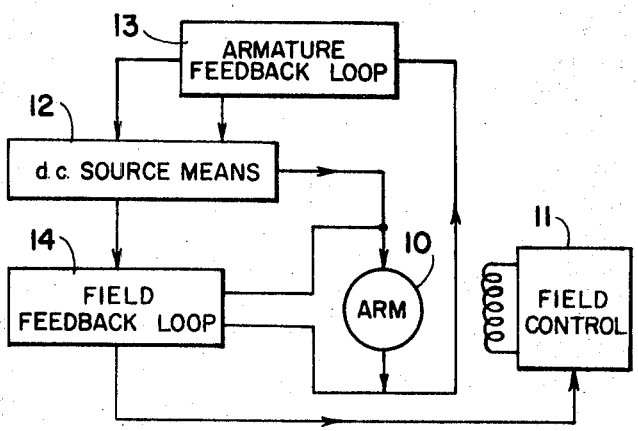
FIG. 1 is a basic block diagram of the DC motor drive of this invention.

Referring first to FIG. 1, there is shown a DC motor including an armature 10 and field control winding 11 driven from a DC source means 12.

In accord with the invention, there is provided an armature feedback loop 13 connected between the armature 10 and the DC source means 12 and, cooperating therewith, a field feedback loop connected between the armature 10 and field control winding 11.

Figure 2:
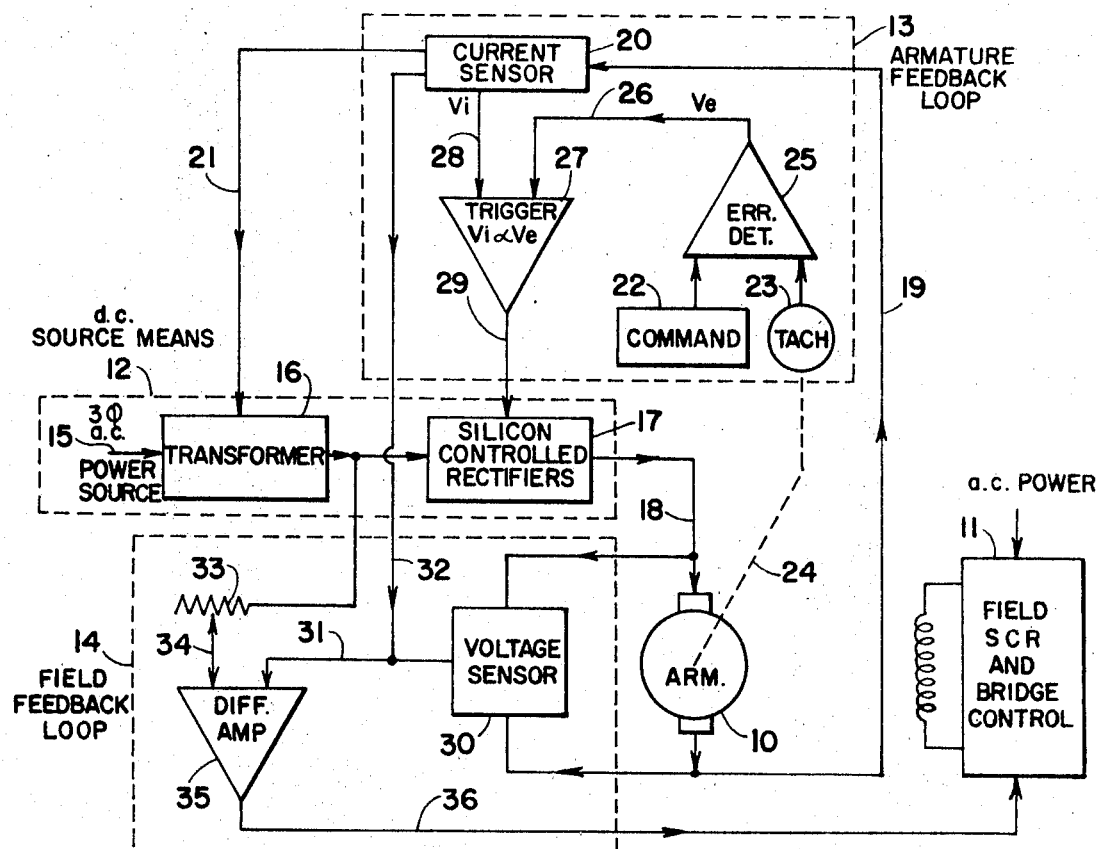
FIG. 2 is a more detailed block diagram of basic components illustrated in FIG. 1.

Referring now to FIG. 2, the basic blocks described in FIG. 1 are illustrated in dashed lines designated by the corresponding numerals and incorporating the basic components making up the circuit of the block.

Referring first to the DC source means 12, in the particular embodiment disclosed, the circuit is initially supplied from a three-phase AC power source indicated by the arrow 15 passing into a transformer 16 having its output connected to a silicon-controlled rectifier circuit 17. The output from the circuit 17 constitutes a current passed through the line 18 to the armature 10. The current circuit to the armature is completed by the line 19 which incorporates a current sensor 20 and a return line 21 to the transformer 16. The current sensor 20 constitutes part of the armature feedback loop 13. This circuit includes a command input 22 providing a command signal. A tachometer means in the form of a simple tachometer 23 in turn in coupled to the armature 10 and provides a reference signal constituting a function of the speed of the armature. The command signal from the command unit 22 and the reference signal from the tachometer 23 are fed to an error detector 25 which provides an output signal $U_e$ on line 26 constituting a function of the command signal and reference signal. A trigger means 27 is connected to receive on a first input line 28 a first armature signal $U_i$ derived from the current sensor 20 and on a second terminal the output signal $U_i$ from the line 26. The output from the trigger means 27 is passed through line 29 to the silicon-controlled rectifier circuit 17. This output is in the form of a current control signal proportional to a given relationship between the armature signal and output signal received in the trigger means.

This current control signal in the event that silicon-controlled rectifiers are employed in the DC source means is applied to the control electrodes of the rectifiers to gate their operation and thus control the DC current supplied in the line 18 to the armature 10. The rectifiers are preferably connected to provide bidirectional control.

Referring now to the field feedback loop 14, there is included a voltage sensor 30 connected across the armature 10 for providing a second armature signal on an output lead 31. A lead 32 from the current sensor 20 connects to lead 31 to compensate for the IR drop in the armature. A line voltage is provided from the output of the transformer 16 on a variable potentiometer 33 so that a line voltage signal constituting a function of the line voltage is provided on the line 34 from the potentiometer 33.

The second armature signal from the voltage sensor 30 less the IR drop as sensed by line 32, and the line voltage signal on 34 are fed into a differential amplifier 35. The output from the differential amplifier on line 36 is in the form of a regulating signal passed to the field winding control 11.

OPERATION

In operation, and with specific reference to FIG. 2, assume that the command signal from the command 22 is, for the moment of constant value in accord with a desired speed for the motor. This desired speed is stabilized by the armature feedback loop as follows: the current passing into the armature from the silicon-controlled rectifier on the line 18 is detected as it passes through the line 19 through the current sensor 20 and passed to the trigger means 27. Also passed to the trigger means 27 is the difference between the command signal and the reference signal from the tachometer 23 at the output of the error detector 25. When the armature is operating at the desired speed, the combination of the signals from the current sensor and the error detector, $U_i$ and $V_e$, result in an output current control signal on the lead 29 from the trigger means 27 such that the current supplied to the armature will be maintained at a given value. Should the armature speed be slowed down, as for example by some external means, there will be a change in the reference signal from the tachometer 23. The error signal from the error detector 25 will thus increase and therefore the output current signal on the output 29 from the trigger 27 will change and this change so controls the silicon-controlled rectifier as to supply further current to the armature 10 thereby speeding up the armature back to its desired value.

From the foregoing, it will thus be seen that the speed of the motor is stabilized by controlling the current to the armature with the attendant advantage of a relatively rapid response time as compared to conventional field intensity control.

If now, it is desired to change the speed of the motor intentionally, it is only necessary to change the command signal from the command 22. This change in the command signal will thus result in a change in the error signal Ve passed to the trigger means 27 to change the current control output on line 29 and thus modify the operation of the silicon-controlled rectifiers 17 to vary the current in line 18 supplied to the armature. The variation is in such a direction that if the command signal is changed with the intention of increasing the armature speed, the current supplied to the armature will be increased and if the command signal is changed to decrease the armature speed, the armature current will be decreased.

In conjunction with the foregoing operation, and in accord with the invention, it is important that the armature 10 be capable of accepting increased current from the DC source means supplied through the line 18. It will be evident that should the back EMF of the armature equal or be greater than the applied voltage across the armature, it is not possible to drive further current through the armature. Thus, the speed of the armature could not be increased within the contemplated speed range.

To avoid the foregoing problem, the voltage sensor 30 detects the voltage across the armature and feeds it with the armature current signal from line 32 into the differential amplifier in conjunction with a line voltage signal on the lead 34 to provide a regulating signal on the output lead 36 to the field winding control 11. Thus, if the back EMF approches too closely to the applied voltage across the armature, as detected by the line voltage signal fed into the differential amplifier, the field intensity is automatically adjusted by the regulating signal to assure that this back EMF will not equal or exceed the applied voltage. With this arrangement, it is thus always possible to drive further current through the armature to vary the speed of the motor throughout its range below base speed. Further, the motor torque will remain substantially constant throughout this speed range. Above base speed wherein field control is used, the horsepower is held substantially constant.

By connecting the armature control silicon-controlled rectifiers such that armature current may be delivered in either direction, there is eliminated the traditional dynamic braking relay and armature resistor used for stopping the motor.

From the foregoing, it will thus be evident that the present invention has provided a greatly improved DC motor drive utilizing a unique combination of both armature and field feedback loops interacting together to realize the desirable advantages of rapid response time in speed adjustments, substantially constant torque below base speed, bidirectional control, and the fact that there is no necessity to compensate for any IR loss in the armature for armature control.

What I claim is:

1. A DC motor drive for a motor having an armature and associated field winding, comprising: an armature feedback loop having means responsive to:
   a. the current flow in said armature,
   b. an input command signal, and
   c. the speed of said armature for providing a control of the current to said armature to thereby provide speed control; and, a field feedback loop having means responsive to:
   a. the voltage across said armature and
   b. the line voltage supplied to said armature for providing a control of the field intensity to assure that the back EMF of said armature is always less than the available DC voltage supplied to said armature, whereby a faster response time of the armature throughout its speed range is realized over the response time occurring when only the field is controlled, the torque of said motor is held substantially constant in the range below base speed, and the horsepower is held substantially constant above the base speed of the motor.

2. A DC motor drive using combined armature and field control comprising, in combination: a motor armature and associated field winding control; a source means of DC bidirectional current connected to said armature and including silicon controlled rectifiers; and armature feedback loop including:
   a. a current sensor connected in series with said armature for providing an armature current signal constituting a function of the current in said armature;
   b. a command source providing a command signal;
   c. means responsive to a function of the speed of said motor armature for providing a reference signal;
   d. an error detector receiving said command signal and reference signal for providing an output signal constituting a function of said command signal and reference signal; and
   e. trigger means receiving said armature current signal and output signal and providing a current control gate signal to said silicon-controlled rectifiers in said source such that current is supplied to said armature in accordance with changes in said current control signal to thereby control the speed of said armature; and a field feedback loop including:
   a. a voltage sensor connected across said armature and a current sensing line from said current sensor connected to the output of said voltage sensor for providing an armature voltage signal constituting a function of the voltage less the IR drop across said armature;
   b. a line voltage detector providing a line voltage signal proportional to the line voltage in said source; and,
   c. differential amplifier means receiving said armature voltage signal and line voltage signal for providing a regulating signal to said field winding control to control the intensity of the field in a manner to maintain the back EMF of said armature less than the available DC voltage from said source means, whereby said DC current source means is always capable of driving more current to the armature to increase the armature speed throughout the speed range of the motor.

3. The subject matter of claim 2, in which said source means of DC current includes a three-phase AC power source; and a transformer having its input connected to said source; said silicon-controlled rectifiers being connected between the output of said transformer and said armature, said current control signal being connected to the trigger control electrodes of said silicon-controlled rectifiers to gate their operation, and said line voltage a signal being derived from the output of said transformer.